United States Patent
Nishida et al.

(10) Patent No.: US 8,357,891 B2
(45) Date of Patent: Jan. 22, 2013

(54) SPEED DETECTION DEVICE, IMAGE FORMING DEVICE, AND COMPUTER READABLE STORAGE MEDIUM STORING SPEED DETECTION PROGRAM

(75) Inventors: Toru Nishida, Kanagawa (JP); Hiroaki Satoh, Kanagawa (JP); Susumu Kibayashi, Kanagawa (JP); Takeshi Zengo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 532 days.

(21) Appl. No.: 12/610,545

(22) Filed: Nov. 2, 2009

(65) Prior Publication Data
US 2010/0329760 A1 Dec. 30, 2010

(30) Foreign Application Priority Data
Jun. 26, 2009 (JP) ................. 2009-152363

(51) Int. Cl.
*G01D 5/34* (2006.01)

(52) U.S. Cl. .......... 250/231.14; 250/231.13; 250/231.18
(58) Field of Classification Search ............ 250/231.14, 250/231.13, 231.18
See application file for complete search history.

(56) References Cited

U.S. PATENT DOCUMENTS
| | | | | |
|---|---|---|---|---|
| 6,639,207 B2 * | 10/2003 | Yamamoto et al. | ...... | 250/231.14 |
| 7,304,295 B2 * | 12/2007 | Sun et al. | ......... | 250/231.14 |
| 2007/0075230 A1 | 4/2007 | Sun et al. | | |

FOREIGN PATENT DOCUMENTS
| | | |
|---|---|---|
| JP | 08-061979 | 3/1996 |
| JP | 2007-101546 | 4/2007 |
| JP | 2008-145299 | 6/2008 |

\* cited by examiner

*Primary Examiner* — Lam S Nguyen
(74) *Attorney, Agent, or Firm* — Fildes & Outland, P.C.

(57) ABSTRACT

The present invention provides a speed detection device comprising: a detected body that includes a plurality of marks arranged along a first direction with intervals therebetween; a detection section that detects intervals of times of appearance of the marks when the detected body relatively moves in the first direction; and a calculation section that calculates a speed of relative movement of the detection section and the detected body on the basis of results of measuring displacements from a reference plane in a second direction, which is orthogonal to the first direction, of locations of the detected body along the first direction and the detected intervals of times of appearance of the marks.

8 Claims, 10 Drawing Sheets

OUTPUT PULSE SIGNAL

SENSING POSITION

SPEED DETECTION DEVICE, IMAGE FORMING DEVICE, AND COMPUTER READABLE STORAGE MEDIUM STORING SPEED DETECTION PROGRAM

CROSS-REFERENCE TO RELATED APPLICATION

This application is based on and claims priority under 35 USC 119 from Japanese Patent Application No. 2009-152363 filed Jun. 26, 2009.

BACKGROUND

Technical Field

The present invention relates to a speed detection device, an image forming device, and a computer-readable storage medium storing a speed detection program.

SUMMARY

According to an aspect of the invention, there is provided a speed detection device comprising: a detected body that includes a plurality of marks arranged along a first direction with intervals therebetween; a detection section that detects intervals of times of appearance of the marks when the detected body relatively moves in the first direction; and a calculation section that calculates a speed of relative movement of the detection section and the detected body on the basis of results of measuring displacements from a reference plane in a second direction, which is orthogonal to the first direction, of locations of the detected body along the first direction and the detected intervals of times of appearance of the marks.

BRIEF DESCRIPTION OF THE DRAWINGS

Exemplary embodiments of the present invention will be described in detail based on the following figures, wherein.

DETAILED DESCRIPTION

Figure 1:
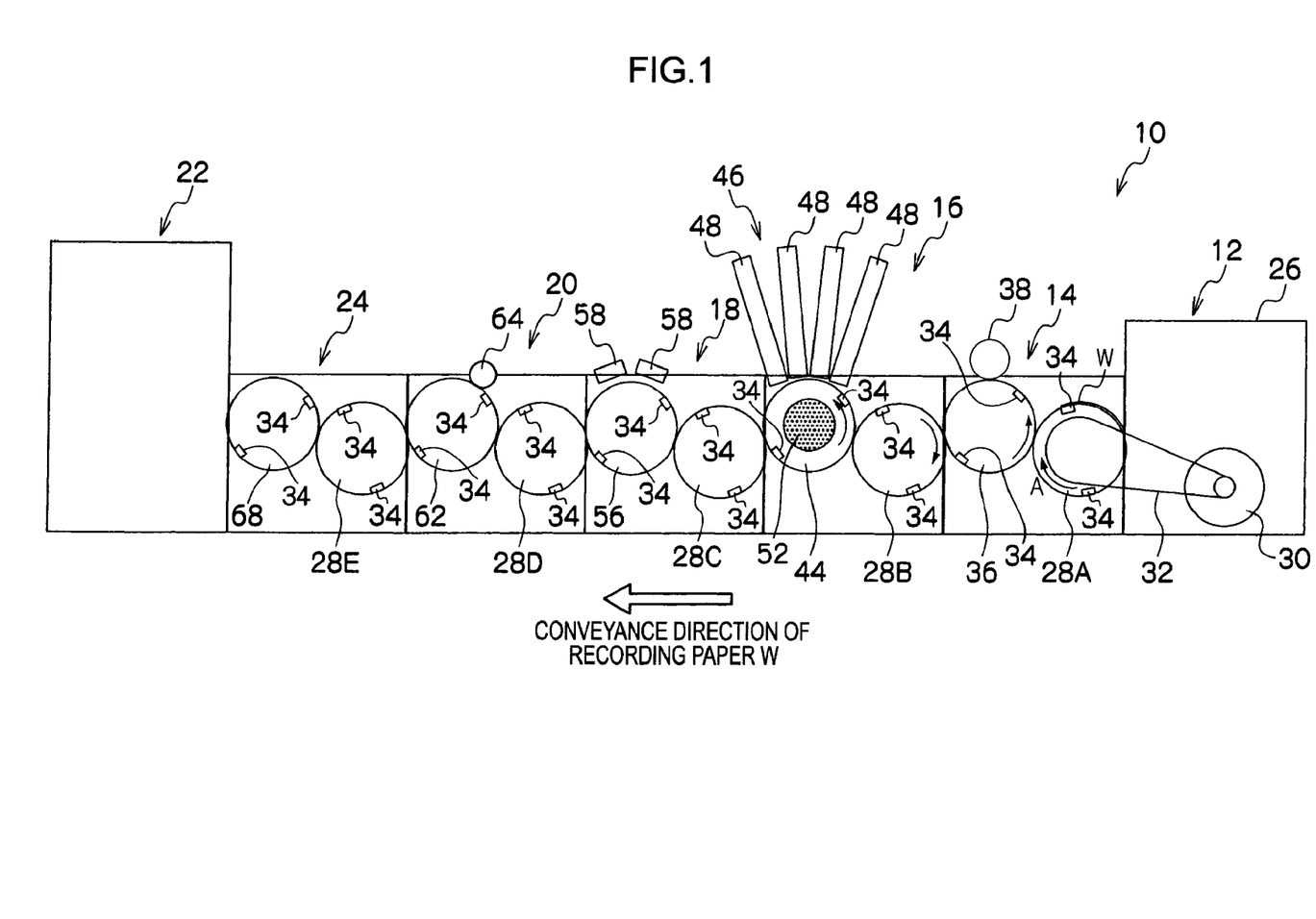
FIG. 1 is a schematic structural diagram of an image forming device.

Herebelow, an example of an exemplary embodiment of the present invention will be described in detail with reference to the drawings. An image forming device 10 relating to the present exemplary embodiment is illustrated in FIG. 1. The image forming device 10 relating to the present exemplary embodiment forms (records) an image at a recording medium with an inkjet system. However, the image forming device may be an image forming device that records an image with an electro-photography system or other recording system.

As shown in FIG. 1, the image forming device 10 is provided with a paper supply conveyance section 12 that supplies and conveys recording paper W, which is a recording medium Downstream in a conveyance direction of the recording paper W in the image forming device 10, a processing fluid application section 14, an image formation section 16, an ink drying section 18, an image fixing section 20 and an ejection conveyance section 24 are provided in this order along the conveyance direction of the recording paper W. The processing fluid application section 14 applies processing fluid to a recording face (front face) of the recording paper W. The image formation section 16 forms an image at the recording face of the recording paper W. The ink drying section 18 dries the image formed at the recording face. The image fixing section 20 fixes the dried image to the recording paper W. The ejection conveyance section 24 ejects the recording paper W to which the image has been fixed to an ejection section 22. The paper supply conveyance section 12 is provided with an accommodation section 26 that accommodates the recording paper W. At the accommodation section 26, a motor 30 and a paper supply apparatus (not shown in the drawing) are provided. The recording paper W is fed out from the accommodation section 26 toward the processing fluid application section 14 by the paper supply conveyance section 12.

An intermediate conveyance drum 28A and a processing fluid application drum 36 are provided at the processing fluid application section 14 in this order along the conveyance direction of the recording paper W. A rotation axle of the intermediate conveyance drum 28A and a rotation axle of the motor 30 are linked by a belt 32. Rotary driving force of the motor 30 is transmitted through the belt 32 and the intermediate conveyance drum 28A turns in the direction of arrow A in FIG. 1. A retention member 34 is provided at the intermediate conveyance drum 28A, and nips a leading end portion of the recording paper W and retains the recording paper W. Thus, the recording paper W that has been fed out from the accommodation section 26 toward the processing fluid application section 14 is retained at the peripheral face of the intermediate conveyance drum 28A by means of the retention member 34, and is conveyed to the processing fluid application drum 36 by rotation of the intermediate conveyance drum 28A. Similarly to the intermediate conveyance drum 28A, retention members 34 are also provided at intermediate conveyance drums 28B, 28C, 28D and 28E, the processing fluid application drum 36, an image forming drum 44, an ink drying drum 56, an image fixing drum 62 and an ejection conveyance drum 68. Handovers of the recording paper W from upstream side drums to downstream side drums are implemented by these retention members 34.

The processing fluid application drum 36 is linked with the intermediate conveyance drum 28A via gears (not shown). Rotary driving force of the motor 30 is transmitted to the intermediate conveyance drum 28A and the intermediate conveyance drum 28A is turned. The recording paper W that has been conveyed by the intermediate conveyance drum 28A is passed over to the processing fluid application drum 36 via the retention member 34 of the processing fluid application drum 36. Then, the recording paper W is conveyed in a state of being retained at the peripheral face of the processing fluid application drum 36. At an upper portion of the processing fluid application drum 36, a processing fluid application roller 38 is disposed in a state touching against the peripheral face of the processing fluid application drum 36. A processing fluid is applied to the recording paper W on the peripheral face of the processing fluid application drum 36, to the recording face thereof, by the processing fluid application roller 38. Herein, the processing fluid reacts with the ink and causes a colorant (pigment) to aggregate, and promotes separation of a solvent from the colorant. The recording paper W to which the processing fluid has been applied is conveyed toward the image formation section 16 in accordance with rotation of the processing fluid application drum 36.

At the image formation section 16, the intermediate conveyance drum 28B and the image forming drum 44 are provided in this order along the conveyance direction of the recording paper W. The intermediate conveyance drum 28B is linked with the intermediate conveyance drum 28A via gears (not shown). Rotary driving force of the motor 30 is transmitted to the intermediate conveyance drum 28B and the intermediate conveyance drum 28B is turned. The recording paper W that has been conveyed by the processing fluid application drum 36 is passed over to the intermediate conveyance drum 28B via the retention member 34 of the intermediate conveyance drum 28B of the image formation section 16. Then, the recording paper W is conveyed in a state of being retained at the peripheral face of the intermediate conveyance drum 28B. The image forming drum 44 is linked with the intermediate conveyance drum 28B via gears (not shown). Rotary driving force of the motor 30 is transmitted to the image forming drum 44 and the image forming drum 44 is turned. The recording paper W is passed over to the image forming drum 44 via the retention member 34 of the image forming drum 44, and the recording paper W is conveyed in a state of being retained at the peripheral face of the image forming drum 44.

Figure 2:
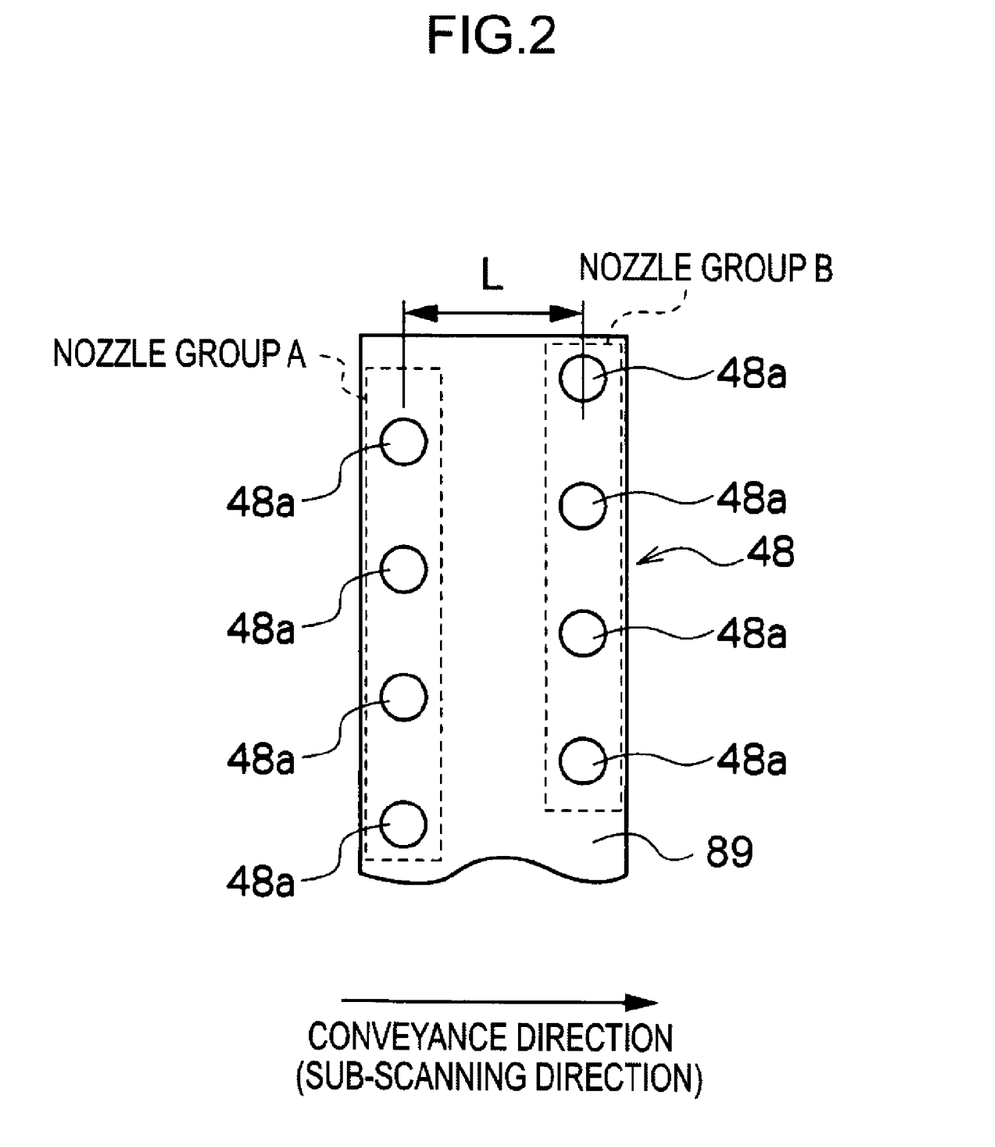
FIG. 2 is a plan view illustrating an arrangement of nozzles at an ink ejection aperture face of a recording head.

Upward of the image forming drum 44, a head unit 46 is disposed close to the peripheral face of the image forming drum 44. The head unit 46 is provided with four inkjet recording heads 48, which eject ink droplets of mutually different colors (each of yellow (Y), magenta (M), cyan (C) and black (K)). As illustrated in FIG. 2, plural nozzles 48a, which eject droplets of the respective inks, are formed in ink ejection aperture faces 89 of these inkjet recording heads 48, which oppose the peripheral face of the image forming drum 44. At each inkjet recording head 48, the plural nozzles 48a are arranged in a substantial matrix pattern in which the positions of the plural nozzles 48a do not overlap along the direction of conveyance of the recording paper W by the image forming drum 44 (a sub-scanning direction) (more specifically, a staggered pattern in which the positions along the sub-scanning direction are mutually different). Therefore, the inkjet recording heads 48 attain a high density of effective nozzle spacing (projected nozzle pitch) along the head length direction (a direction orthogonal to the sub-scanning direction). In each of the inkjet recording heads 48 relating to the present exemplary embodiment, the plural nozzles 48a are arranged in two rows with respect to the sub-scanning direction. These two nozzle rows are separated by a distance L in the sub-scanning direction. The inkjet recording heads 48 are arranged along the peripheral direction of the image forming drum 44. The inkjet recording heads 48 eject the ink droplets from the nozzles 48a with timings synchronized with clock signals, which are described later, so as to overlay the droplets on the processing fluid layer that has been formed at the recording face of the recording paper W by the processing fluid application section 14. Thus, the inkjet recording heads 48 form (record) an image on the recording paper W. The recording paper W on which the image has been formed is conveyed to the ink drying section 18 in accordance with rotation of the image forming drum 44.

Figure 3A:
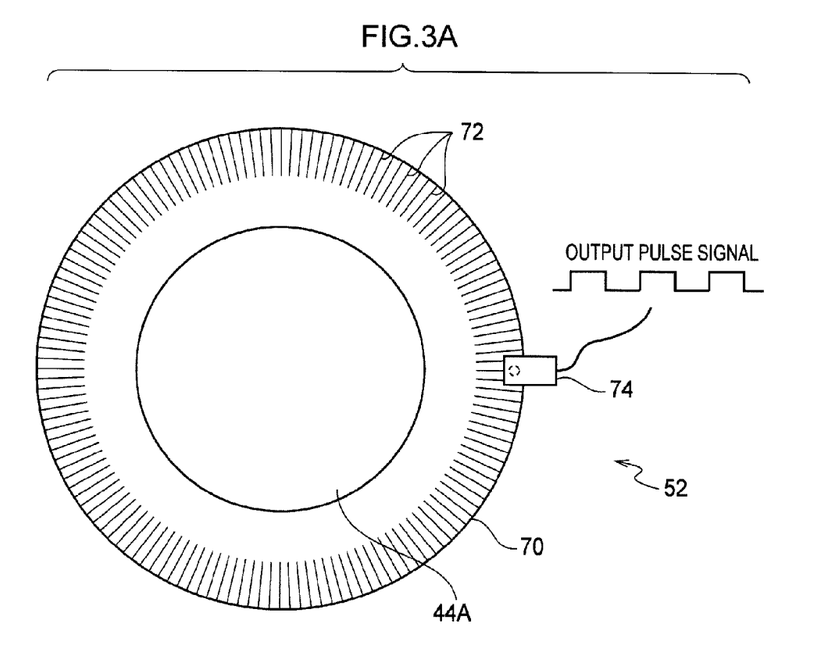
FIG. 3A is a plan view of a rotary encoder.

A rotary encoder 52 is attached to the image forming drum 44. As illustrated in FIG. 3A, the rotary encoder 52 is structured with a code wheel 70 and a sensing section 74. The code wheel 70 has a flat disc shape. A plural number of lines 72 with a higher density than the surface of the rotary encoder 52 (the background) are recorded on the surface of a peripheral edge portion of the code wheel 70. The code wheel 70 is attached to the rotary encoder 52 so as to be coaxial with a rotary axle (hub) 44A of the image forming drum 44 at an outer periphery of the image forming drum 44. The sensing section 74 is disposed at the outer periphery of the code wheel 70 and senses the lines 72 that are recorded on the surface of the code wheel 70. The code wheel 70 turns integrally with the image forming drum 44. The individual lines 72 recorded on the surface of the code wheel 70 are recorded in radial forms with a consistent spacing along the circumferential direction of the code wheel 70, such that length directions of the lines 72 run along the radial direction of the code wheel 70. When the total number of the lines 72 recorded on the surface of the code wheel 70 is denoted by N, an angle $\Theta_0$ formed by the length directions of a pair of neighboring lines 72 on the surface of the code wheel 70 (which is a rotation angle of the code wheel 70 in the period of a single cycle of an output pulse signal, i.e., a pulse angle of the code wheel 70) is given by the following equation (1).

$$\Theta_0 = 2\pi/N \text{(rad)} \quad (1)$$

Figure 3B:
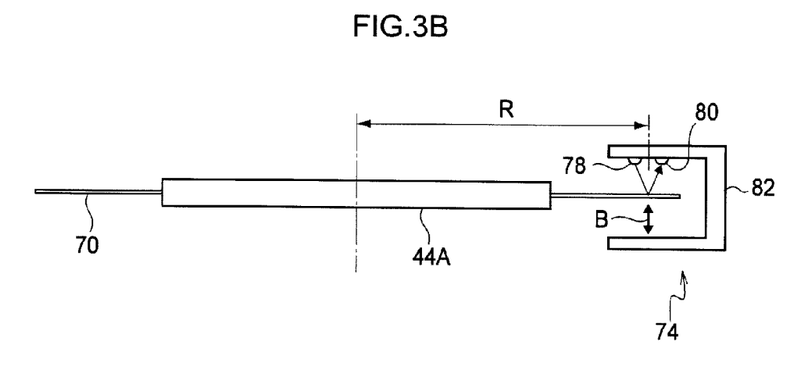
FIG. 3B is a side view of the rotary encoder.

As illustrated in FIG. 3B, the sensing section 74 is structured by attaching a light source 78 and an optoelectronic conversion section 80 to a bracket 82. The light source 78 is formed of an LED, a laser diode or the like, and irradiates light at a specific position of the peripheral edge portion of the code wheel 70 at whose surface the lines 72 are recorded (which is a position separated by a distance R from the center of the code wheel 70). The optoelectronic conversion section 80 is formed of a phototransistor or the like, and detects light that has been emitted from the light source 78 and reflected at the specific position of the surface of the code wheel 70 (a sensing position). The optoelectronic conversion section 80 outputs currents corresponding to detected light amounts. When light is emitted from the light source 78 and the code wheel 70 turns integrally with the image forming drum 44, the portions of the surface of the code wheel 70 at which the lines 72 are recorded cut across the sensing position. At these times, detected light amounts at the optoelectronic conversion section 80 are reduced. By this being repeated, currents from the optoelectronic conversion section 80 are outputted in the form of the rectangular waveform output pulse signal illustrated in FIG. 3A.

At the ink drying section 18, the intermediate conveyance drum 28C and the ink drying drum 56 are provided in this order along the conveyance direction of the recording paper W. The intermediate conveyance drum 28C is linked with the intermediate conveyance drum 28A via gears (not shown). Rotary driving force of the motor 30 is transmitted to the intermediate conveyance drum 28C and the intermediate conveyance drum 28C is turned. The recording paper W that has been conveyed by the image forming drum 44 is passed over to the intermediate conveyance drum 28C via the retention member 34 of the intermediate conveyance drum 28C. Then the recording paper W is conveyed in a state of being retained at the peripheral face of the intermediate conveyance drum 28C. The ink drying drum 56 is linked with the intermediate conveyance drum 28C via gears (not shown). Rotary driving force of the motor 30 is transmitted to the ink drying drum 56 and the ink drying drum 56 is turned. The recording paper W that has been conveyed by the intermediate conveyance drum 28C is passed over to the ink drying drum 56 via the retention member 34 of the ink drying drum 56. Then the recording paper W is conveyed in a state of being retained at the peripheral face of the ink drying drum 56. Upward of the ink drying drum 56, hot air heaters 58 are disposed close to the peripheral face of the ink drying drum 56. The hot air heaters 58 supply hot airflows to the recording paper W and remove excess solvent contained in the image formed on the recording paper W. The recording paper W at which the image on the recording face has been dried by the ink drying section 18 is conveyed toward the image fixing section 20 in accordance with rotation of the ink drying drum 56.

At the image fixing section 20, the intermediate conveyance drum 28D and the image fixing drum 62 are provided in this order along the conveyance direction of the recording paper W. The intermediate conveyance drum 28D is linked with the intermediate conveyance drum 28A via gears (not shown). Rotary driving force of the motor 30 is transmitted to the intermediate conveyance drum 28D and the intermediate conveyance drum 28D is turned. The recording paper W that has been conveyed by the ink drying drum 56 is passed over to the intermediate conveyance drum 28D via the retention member 34 of the intermediate conveyance drum 28D. Then the recording paper W is conveyed in a state of being retained at the peripheral face of the intermediate conveyance drum 28D. The image fixing drum 62 is linked with the intermediate conveyance drum 28D via gears (not shown). Rotary driving force of the motor 30 is transmitted to the image fixing drum 62 and the image fixing drum 62 is turned. The recording paper W that has been conveyed by the intermediate conveyance drum 28D is passed over to the image fixing drum 62 via the retention member 34 of the image fixing drum 62, and the recording paper W is conveyed in a state of being retained at the peripheral face of the image fixing drum 62. At an upper portion of the image fixing drum 62, a fixing roller 64 incorporating a heater is disposed in a state abutting against the peripheral face of the image fixing drum 62. The recording paper W retained at the peripheral face of the image fixing drum 62 is heated by the heater in a state in which the recording paper W is abutted against the fixing roller 64. As a result, colorant in the image formed at the recording face is fused to the recording paper W, and the image formed at the recording face is fixed to the recording paper W. The recording paper W to which the image has been fixed is conveyed toward the ejection conveyance section 24 in accordance with rotation of the image fixing drum 62.

At the ejection conveyance section 24, the intermediate conveyance drum 28E and the ejection conveyance drum 68 are provided in this order along the conveyance direction of the recording paper W. The intermediate conveyance drum 28E is linked with the intermediate conveyance drum 28A via gears (not shown). Rotary driving force of the motor 30 is transmitted to the intermediate conveyance drum 28E and the intermediate conveyance drum 28E is turned. The recording paper W that has been conveyed by the image fixing drum 62 is passed over to the intermediate conveyance drum 28E via the retention member 34 of the intermediate conveyance drum 28E. Then the recording paper W is conveyed in a state of being retained at the peripheral face of the intermediate conveyance drum 28E. The ejection conveyance drum 68 is linked with the intermediate conveyance drum 28E via gears (not shown). Rotary driving force of the motor 30 is transmitted to the ejection conveyance drum 68 and the ejection conveyance drum 68 is turned. The recording paper W that has been conveyed by the intermediate conveyance drum 28E is passed over to the ejection conveyance drum 68 via the retention member 34 of the ejection conveyance drum 68. Then the recording paper W is conveyed toward the ejection section 22 in a state of being retained at the peripheral face of the ejection conveyance drum 68.

Figure 4:
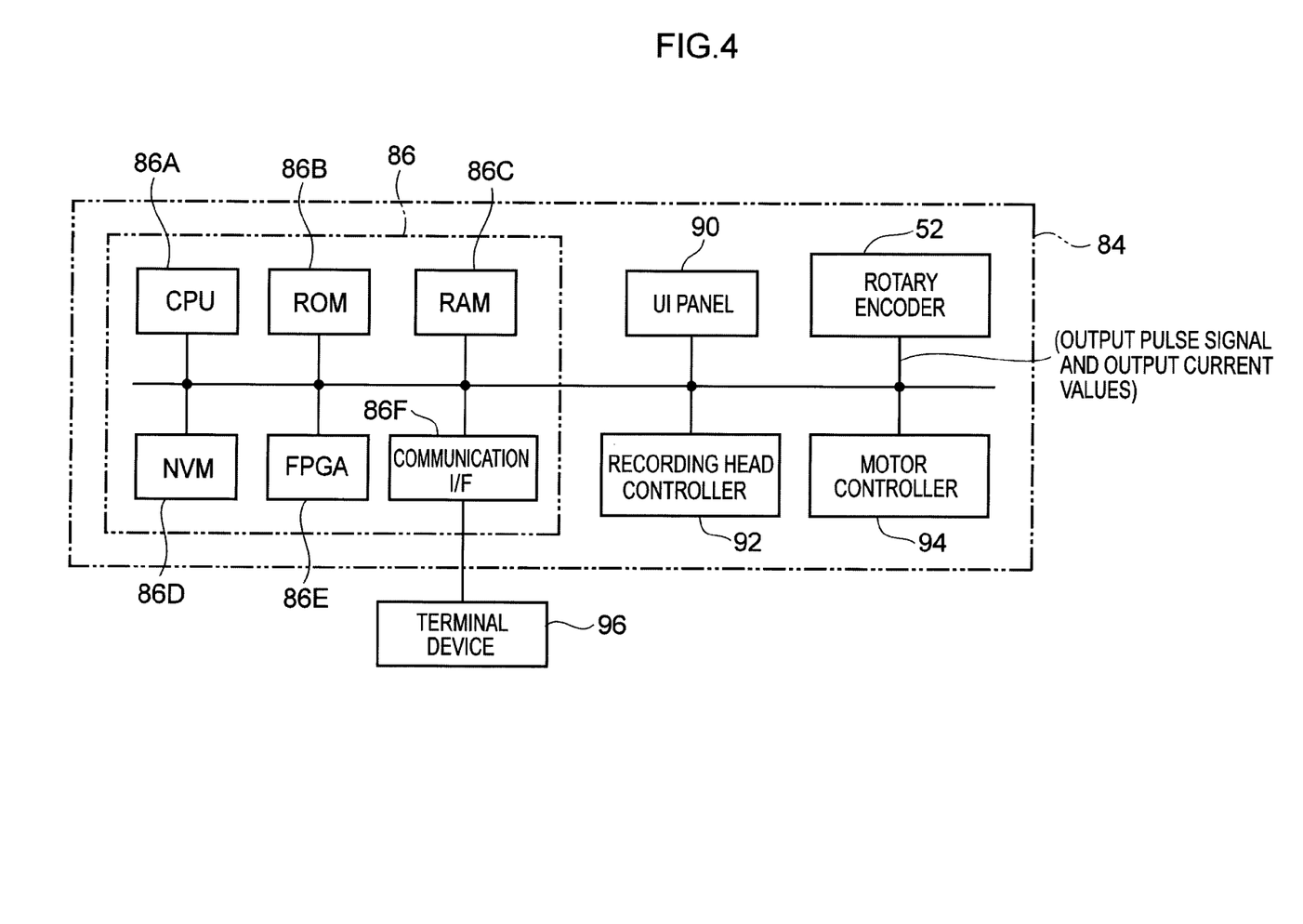
FIG. 4 is a block diagram illustrating schematic structure of a control section of the image forming device.

The image forming device 10 is equipped with the control section 84 illustrated in FIG. 4. The control section 84 is provided with a CPU 86A, a ROM 86B, a RAM 86C, an NVM (nonvolatile memory) 86D, an FPGA (field programmable gate array) 86E and a communications I/F (interface) section 86F. The image forming device 10 incorporates a computer 86, which is structured by connecting the above to one another through a system bus 88. A UI (user interface) panel 90, the rotary encoder 52, a recording head controller 92 and a motor controller 94 are connected to the computer 86 through the system bus 88.

The CPU 86A reads and executes a control program from the ROM 86B. Thus, the CPU 86A carries out control processing which controls operations of the respective parts of the image forming device 10. The above-mentioned control program, and a speed detection program for the FPGA 86E to carry out speed detection processing (described later) are memorized in the ROM 86B. The RAM 86C is used as a work area when the CPU 86A and FPGA 86E are executing various programs, and the like. The NVM 86D memorizes various kinds of information, including information that must be retained in periods when a power supply of the image forming device is disconnected. The FPGA 86E reads and executes the aforementioned speed detection program from the ROM 86B. Thus, the FPGA 86E carries out speed detection processing. The communications OF section 86F is connected to a terminal device 96, which is constituted by a personal computer or the like, and receives image information representing an image to be formed on the recording paper W and other kinds of information from the terminal device 96.

The UI panel 90 is structured to include a display section for displaying various kinds of information and an input section at which a user may input arbitrary information, instructions and the like. Specifically, the UI panel 90 is structured by, for example, a touch panel display in which a transparent touch panel serving as the input section is superposed on a display monitor serving as the display section, or the like. The rotary encoder 52 provides the output pulse signal that is outputted from (the optoelectronic conversion section 80 of) the sensing section 74 in accordance with rotation of the image forming drum 44 to the ejection conveyance drum 68. Herein, the rotary encoder 52 incorporates a current sensing section (not illustrated) that senses magnitudes of output currents from the optoelectronic conversion section 80. The current sensing section outputs sensed output current values from the optoelectronic conversion section 80 to the computer 86. The recording head controller 92 controls operations of the inkjet recording heads 48 in accordance with instructions from the CPU 86A, and the motor controller 94 controls operations of the motor 30 in accordance with instructions from the CPU 86A.

Now, operation of the present exemplary embodiment will be described. In the image forming device 10 relating to the present exemplary embodiment, the recording paper W is fed out from the accommodation section 26 to the intermediate conveyance drum 28A by the paper supply conveyance section 12. Then the recording paper W is conveyed to the image forming drum 44 via the intermediate conveyance drum 28A, the processing fluid application drum 36 and the intermediate conveyance drum 28B, and is retained at the peripheral face of the image forming drum 44. In the present exemplary embodiment, a rotation speed (specifically a rotation angular speed ω) of the image forming drum 44 is calculated by the FPGA 86E on the basis of the output pulse signal from the rotary encoder 52. The CPU 86A causes ink drops to be ejected from the nozzles 48a of the inkjet recording heads 48 toward the recording paper W on the image forming drum 44, on the basis of the image information. In association therewith, the CPU 86A controls the ejection of the ink drops via the recording head controller 92 so as to alter the ink drop ejection timings in accordance with variations in the rotation angular speed ω of the image forming drum 44 calculated by the FPGA 86E (shortening the ejection time interval of the ink drops when the rotation angular speed ω is higher). Thus, an image is formed at the recording paper W in which the spacings of the dots forming the image on the recording paper W (which is an image represented by the image information) are substantially uniform regardless of variations in the rotation speed of the image forming drum 44.

When the total number of the lines 72 recorded on the surface of the code wheel 70 of the rotary encoder 52 is denoted as N, the pulse angle of the code wheel 70 is denoted as $\Theta_0$ (see the previous equation (1)), and a period of the output pulse signal from the rotary encoder 52 is denoted as T, the rotation angular speed ω of the code wheel 70 (the image forming drum 44) is represented by the following equation (2).

$$\omega = \Theta_0 / T (rad/s) \quad (2)$$

Figure 5A:
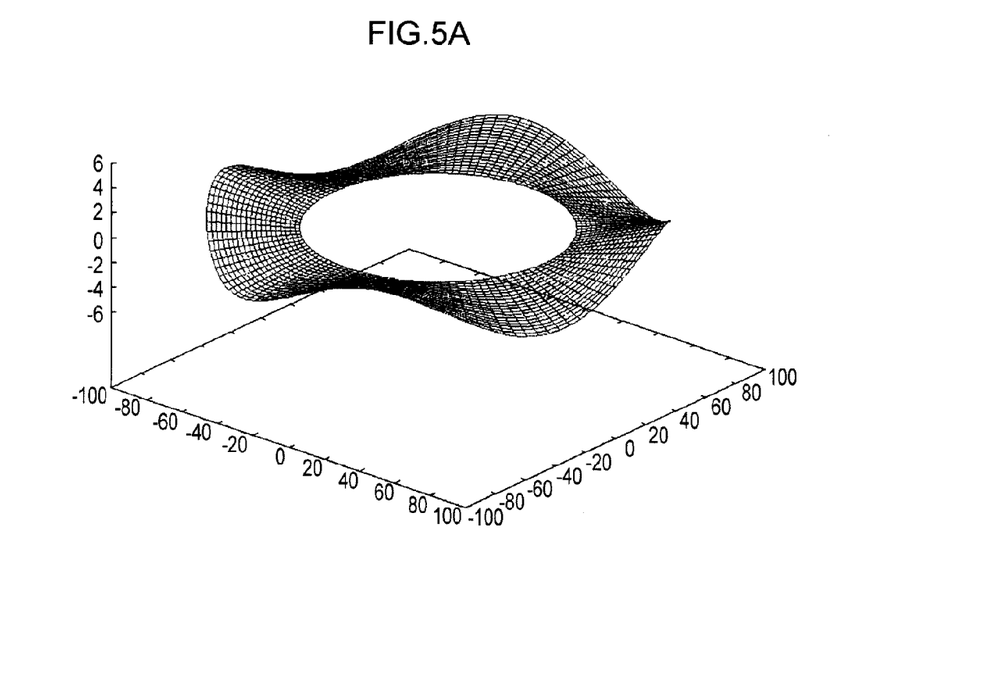
FIG. 5A is a schematic view illustrating an example of a ripple deformation occurring at a code wheel.

Now, in order to improve the precision of detection and calculation of the rotation angular speed ω of the code wheel 70 (the image forming drum 44), an increase in rotation angle resolution of the code wheel 70 (the number of the lines 72 recorded at the code wheel 70) may be implemented. However, the code wheel 70 would have to be increased in diameter for this (for example, the diameter of the code wheel 70 is 140 mm and the number of recorded lines is 6000, or the like). If the code wheel 70 is increased in diameter, rigidity of the code wheel 70 falls and, for example, as shown in FIG. 5A, portions of the code wheel 70 displace in the rotation axis direction of the code wheel 70 (a direction orthogonal to the movement direction (rotation direction) of the code wheel 70) (hereinafter, these deformations are referred to as "ripple deformations"). Causes of these ripple deformations include the quality of the code wheel 70 itself (planarity), warping of the code wheel 70 that occurs when the code wheel 70 is attached to the hub 44A, deformations associated with temperature changes, and so forth. Beside the ripple deformations, when the code wheel 70 is attached to the hub 44A, inclination of the code wheel 70 with respect to an attachment reference plane (below referred to simply as "the reference plane") occurs.

Figure 5B:
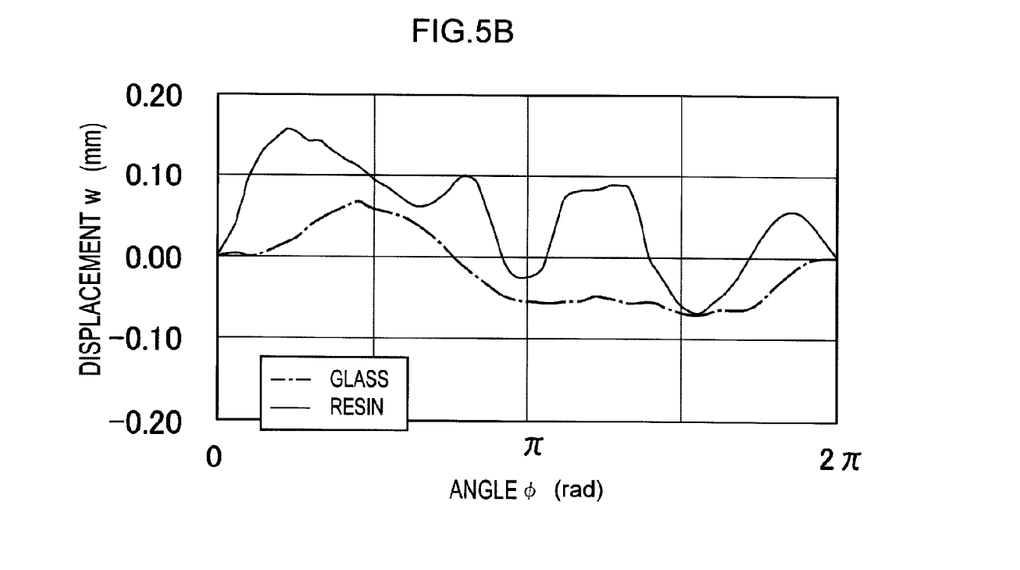
FIG. 5B is a graph illustrating an example of a distribution, along a code wheel circumferential direction, of displacement amounts of the code wheel in a rotation axis direction.

FIG. 5B illustrates results of measuring, with a laser displacement meter, displacement amounts w in the rotation axis direction of, of the surface of the code wheel 70 attached to the hub 44A, the sensing position separated by the distance R from the center of the code wheel 70, over the whole circumference. In FIG. 5B, the angle φ represents a rotation angle from a certain position in the circumferential direction of the code wheel 70 (a reference position). A position at which the displacement amount w equals zero corresponds to a reference position of the code wheel 70. As is clear from FIG. 5B, the displacement amounts w of the sensing position of the surface of the code wheel 70 in the rotation axis direction according to the sensing section 74 vary over the whole circumference of the code wheel 70 due to ripple deformations, inclination relative to the reference plane, and the like. With regard to costs and the like, it is desirable if the code wheel 70 is made of resin rather than glass. However, a code wheel made of resin has lower rigidity than a code wheel made of glass. Therefore, deformations of a code wheel made of resin have larger displacement amounts w in the rotation axis direction overall.

Figure 6A:
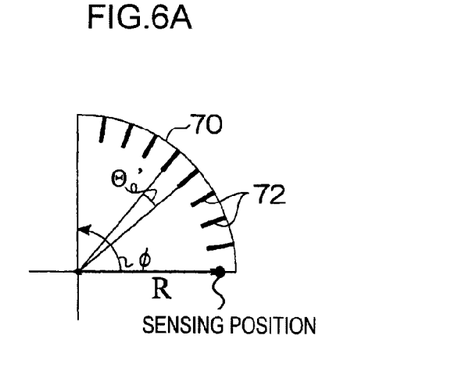
FIG. 6A, FIG. 6B and FIG. 6C are conceptual views for explaining a method of calculation of rotation angular speeds of the code wheel that takes account of displacements in the rotation axis direction of the code wheel.
Figure 6B:
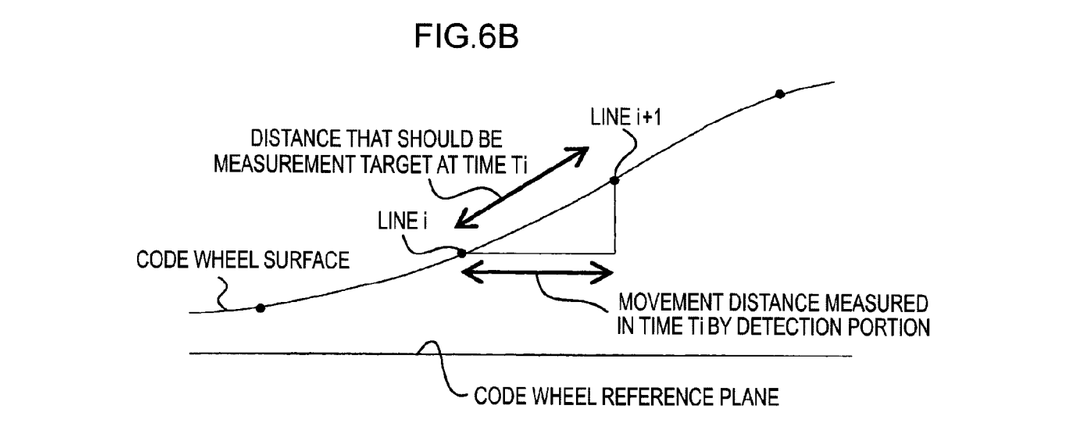

When a ripple deformation occurs at the code wheel 70, the peripheral length along the surface of the code wheel 70 is lengthened. Therefore, a total of the pulse angles becomes larger than 2π, and the relationship in the aforementioned equation (1) no longer stands. Moreover, the sensing section 74 of the rotary encoder 52 is disposed on the presumption that there is no deformation of the code wheel 70 in the rotation axis direction with respect to the reference plane. Therefore, when the code wheel 70 is displaced in the rotation axis direction relative to the reference plane, at least at the sensing position of the surface of the code wheel 70, the line intervals that are the subject of measurement by the sensing section 74 (movement distances of the code wheel 70 at the sensing position in the period T of the output pulse signal from the sensing section 74) are the distances if the actual line intervals along the surface of the code wheel 70 were to be projected onto the reference plane, and differ from the actual line intervals, as is illustrated in FIG. 6B.

If displacements in the rotation axis direction of the code wheel 70 occur at least at the sensing position of the code wheel 70 and the rotation angular speed ω of the code wheel 70 (the image forming drum 44) is calculated in accordance with equation (2), then errors relative to the actual rotation angular speed arise. In the image forming device 10 relating to the present exemplary embodiment, the ink droplets are ejected from the nozzles 48a of the inkjet recording heads 48 at timings in accordance with the calculated rotation angular speed ω of the code wheel 70 (the image forming drum 44). Consequently, errors in calculation of the rotation angular speed ω will be manifested as distortions of the image formed at the recording paper W.

Accordingly, in the image forming device 10 relating to the present exemplary embodiment, when rotary driving of the image forming drum 44 for forming an image on the recording paper W is started, the FPGA 86E reads and executes the speed detection program from the ROM 86B. Hence, while the image forming drum 44 is being driven to turn, the speed detection processing is carried out by the FPGA 86E. Herebelow, a method of calculation of the rotation angular speed ω of the code wheel 70 relating to the present exemplary embodiment that is employed in the speed detection processing, and which takes account of displacements of the code wheel 70 in the rotation axis direction, is described.

The method of calculation of the rotation angular speed ω relating to the present exemplary embodiment, presumes that displacements of the code wheel 70 in the rotation axis direction, caused by ripple deformations and an inclination relative to the reference plane or the like. In regard to the total of the pulse angles becoming larger than 2π because of a lengthening of the circumferential length along the surface of the code wheel 70, it is assumed that the degree of lengthening of the circumferential length is uniform over the whole circumference of the code wheel 70. That is, the pulse angle of the code wheel 70 is taken to be $\Theta_0'$ for all of the lines 72 on the surface of the code wheel 70 ($\Theta_0' \neq 2\pi/N$)) see FIG. 6A).

Figure 6C:
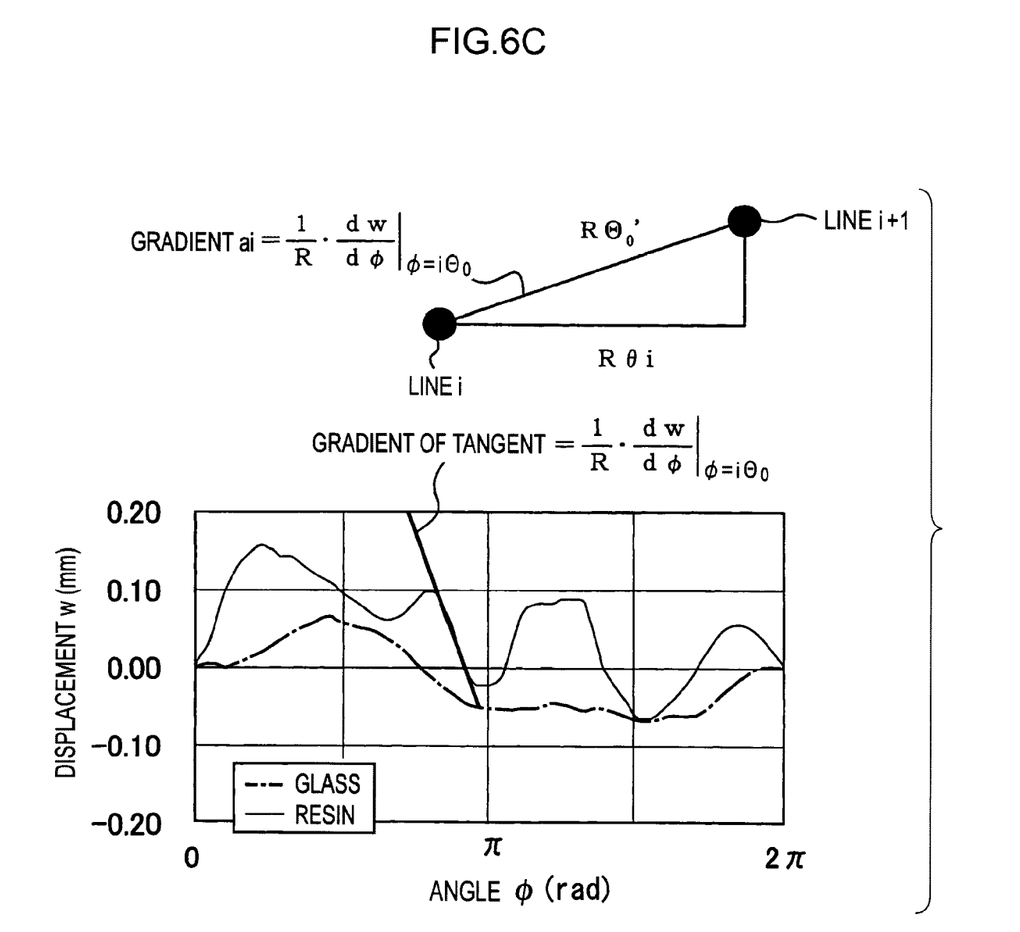

With regard to the difference between the line intervals sensed by the sensing section 74 and the actual line intervals at the surface of the code wheel 70, an actual line interval along the surface of the code wheel 70 at the sensing position is $R\Theta_0'$ (see FIG. 6C). However, the line interval that is the subject of measurement by the sensing section 74 is the distance when the actual line interval along the surface of the code wheel 70 is projected onto the reference plane. Therefore, in the method of calculation of the rotation angular speed ω relating to the present exemplary embodiment, as shown in FIG. 6C, an estimated pulse angle corresponding to the line interval of the target of measurement by the sensing section 74 is taken to be θi. Therefore, the line interval that is the target of measurement by the sensing section 74 is denoted as Rθi. The pulse angle θi is the pulse angle when the lines 72 are projected onto the reference plane, and the following equation (3) stands.

$$\sum_{i=1}^{N} \theta i = 2\pi \quad (3)$$

Here, if a local gradient of change of the displacement amount w in the radial axis direction of the code wheel 70 over the gap between an i-th line and an i+1-th line of the surface of the code wheel 70 is denoted as ai, then the following equation (4) stands, as is clear from FIG. 6C.

$$(R\Theta_0')^2 = (R\theta i)^2 + (aiR\theta i)^2 \quad (4)$$

As illustrated in FIG. 6D, the gradient ai may be expressed by the following equation (5), using a distribution along the circumferential direction of the code wheel 70 of the displacement amounts w of the code wheel 70 in the rotation axis direction at the position of sensing by the sensing section 74 (a profile along the circumferential direction of the displacement amounts w of the code wheel 70).

$$ai = \frac{1}{R} \cdot \frac{dw}{d\phi}\bigg|_{\phi=i\Theta_0'} \quad (5)$$

Here, φ in equation (5) is a rotation angle of the code wheel 70 from the reference position (for example, a Z phase). From the above, equation (6) is obtained for the pulse angle θi, and equation (7) is obtained for the pulse angle $\Theta_0'$.

$$\theta i = \Theta_0' \frac{1}{\sqrt{1 + \frac{1}{R^2} \cdot \left(\frac{dw}{d\phi}\bigg|_{\phi=i\Theta_0'}\right)^2}} \quad (6)$$

$$\Theta_0' = \frac{2\pi}{\sum_{i=1}^{N} \frac{1}{\sqrt{1 + \frac{1}{R^2} \cdot \left(\frac{dw}{d\phi}\bigg|_{\phi=i\Theta_0'}\right)^2}}} \quad (7)$$

If the distribution of the displacement amounts w along the circumferential direction of the code wheel 70 (the profile of displacement amounts w along the circumferential direction of the code wheel 70) is already known, derivatives of the profile of displacement amounts w that correspond to the lines 72 are calculated in accordance with equation (5), the calculated derivatives are substituted into equation (7) to calculate the pulse angles $\Theta_0'$, and the pulse angles $\Theta_0'$ and the derivatives are substituted into equation (6) and the pulse angles θi are calculated. Thus, the pulse angles θi at positions along the circumferential direction of the code wheel 70 that correspond with the lines 72 are calculated. By substituting the calculated pulse angles θi into the following equation (8) together with the period Ti of the output pulse signal, a rotation angular speed ωi of the code wheel 70 is calculated, from which the effect of displacement in the rotation axis direction of the code wheel 70 has been eliminated.

$$\omega i = \theta i / Ti \quad (8)$$

Figure 7:
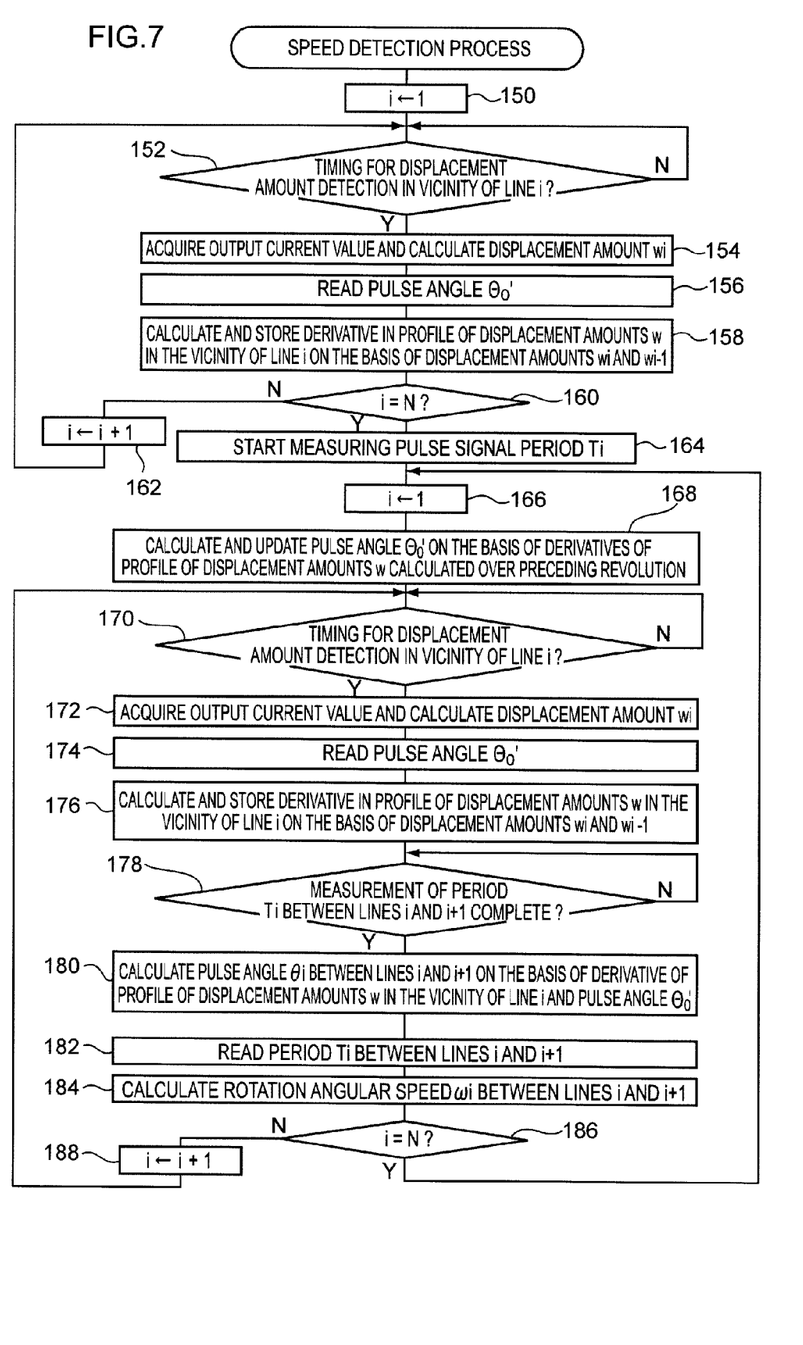
FIG. 7 is a flowchart illustrating details of speed detection processing.

Next, the speed detection processing that is carried out by the FPGA 86E (speed detection processing that employs the calculation method described above to calculate the rotation angular speed ω of the code wheel 70) will be described with reference to FIG. 7. In the present exemplary embodiment, the speed detection program is executed by the FPGA 86E. However, the speed detection program may be executed by the CPU 86A.

In the speed detection processing relating to the present exemplary embodiment, firstly, in step 150, a variable i for identifying the individual lines 72 recorded at the code wheel 70 is set to 1. Then, in step 152, it is determined whether or not a timing for sensing a displacement amount wi of the code wheel 70 in the rotation axis direction, at a vicinity of the portion of the surface of the code wheel 70 at which line i is recorded, has arrived. Step 152 is repeated until the determination of step 152 is positive. As the above-mentioned timing, an arbitrary timing in either of the following periods may be employed: a period in which the gap on the surface of the code wheel 70 between line i−1 and line i is disposed at the sensing position according to the sensing section 74; and a period in which the gap on the surface of the code wheel 70 between line i and line i+1 is disposed at the sensing position according to the sensing section 74.

For example, if a timing at which an approximately central portion of the gap between line i and line i+1 is disposed at the sensing position is employed as the timing for sensing the displacement amount wi, for the determination of step 152 it is determined whether or not a duration corresponding to (Ti−1)/2 has passed since the rise time of a pulse of the output pulse signal from (the sensing section 74 of) the rotary encoder 52 (in which Ti−1 is a duration from the point at which line i−1 passes through the sensing position according to the sensing section 74 until a point at which line i passes therethrough, and may be obtained by measuring the period of the output pulse signal). The sensing timing of the displacement amount wi is not limited by the above descriptions and may be, for example, a timing when a pulse of the output pulse signal rises. Further, the timing may be, for example, a timing when a pre-specified duration has passed since a rise time of a pulse of the output pulse signal (it is sufficient that this duration be smaller than a duration until line i+1 reaches the sensing position according to the sensing section 74). Further yet, the timing may be, for example, a timing when 3(Ti−1)/4 has passed since the rise time of a pulse of the output pulse signal. In other words, provided the timing is a timing at which a gap between neighboring lines is disposed at the sensing position, arbitrary timings are applicable.

When the determination of step 152 is positive, the processing advances to step 154. In step 154, the output pulse signal and an output current value of the optoelectronic conversion section 80, which is inputted from the rotary encoder 52, are acquired. Then in step 154, a displacement amount wi in the rotation axis direction of the code wheel 70 at the vicinity of the line i is calculated on the basis of the acquired output current value. Further in step 154, the calculated displacement amount wi is memorized in the RAM 86C. When a portion of the surface of the code wheel 70 at which the lines 72 are recorded (the gaps between neighboring lines) is disposed at the sensing position, detected light amounts at the optoelectronic conversion section 80 are constant if that portion does not displace in the rotation axis direction of the code wheel 70 (and if that portion coincides with the reference plane, with the displacement amount equaling zero). However, if that portion displaces in the rotation axis direction of the code wheel 70, then as is clear from FIG. 3B, the optical path length of the light that is emitted from the light source 78, reflected at that portion of the surface of the code wheel 70 and detected by the optoelectronic conversion section 80 changes in accordance with the displacement amount w of that portion in the rotation axis direction of the code wheel 70 (the direction of arrow B in FIG. 3B). Hence, the output current value from the optoelectronic conversion section 80 changes in accordance with the change in the detected light amount at the optoelectronic conversion section 80.

According to the above description, for the present exemplary embodiment, the relationship between displacement amounts w and output current values from the optoelectronic conversion section 80 is measured in advance, and the measured relationship is pre-memorized in a non-volatile memory section (the ROM 86B or the NVM 86D) in the form of a table, a computational equation or the like. Hence, the calculation of the displacement amount wi in step 154 is done by reading the information representing the relationship between displacement amounts w and output current values from the above-mentioned memory section, and searching for or calculating the displacement amount w that corresponds to the acquired output current value.

Then, in step 156, a pulse angle $\Theta_0'$ is read from the RAM 86C. The pulse angle $\Theta_0'$ of the code wheel 70 is found by substituting the derivatives of the profile of displacement amounts w into the aforementioned equation (7). However, at the time at which the processing of step 156 is performed, the profile of displacement amounts w is unknown. Therefore, a pre-specified initial value of the pulse angle $\Theta_0'$ (for example, $2\pi/N$) is read out.

In step 158, a derivative of the profile of displacement amounts w at the vicinity of the portion at which line i is recorded is calculated, using the displacement amount wi that has been calculated in step 154 and memorized in the RAM 86C. Various methods are available for a method of calculation of the derivative. In the present exemplary embodiment however, in order to simplify the calculation, a backward difference of the displacement amount wi, as illustrated in the following equation (9), is calculated to serve as an approximate value of the derivative of the profile of displacement amounts w. In the present exemplary embodiment, the backward difference of the displacement amount wi obtained by the calculation is memorized in the RAM 86C or the like to serve as the derivative of the profile of displacement amounts w in the vicinity of line i.

$$\left.\frac{dw}{d\phi}\right|_{\phi=i\Theta_0'} \approx \frac{w_i - w_{i-1}}{\Theta_0'} \qquad (9)$$

In equation (9), wi−1 is the displacement amount of the code wheel 70 at the vicinity of the portion of the surface of the code wheel 70 at which line i−1 is recorded. When the processing of step 158 is first performed, the displacement amount wi−1 is unknown. Accordingly, the calculation may be performed using a substitute value as the displacement amount wi−1 (for example, a value the same as the displacement amount wi), or the derivative may simply be set to be zero.

The derivatives of the profile of displacement amounts w are not limited to backward differences of the displacement amounts wi as described above. The derivatives may utilize forward differences, central (centered) differences or the like.

The derivatives may also be calculated by measuring displacement amounts w over the whole circumference of the code wheel 70 and then approximating the profile of displacement amounts w obtained by the measurements with a suitable function (for example, a power function (an exponentiation function), a spline function or the like), and differentiating the function obtained by the approximation.

Then, in step 160, it is determined whether or not the variable i has reached N, the total number of the lines 72 recorded at the surface of the code wheel 70. If this determination is negative, the variable i is incremented by 1 in step 162, after which the processing returns to step 152. Thus, steps 152 to 162 are repeated until the determination of step 160 is positive. Accordingly, the derivatives of the profile of displacement amounts w of the code wheel 70 at the vicinities of the positions at which the individual lines 72 are recorded on the surface of the code wheel 70 are sequentially calculated and memorized.

When the code wheel 70 has turned through one revolution after the start of execution of the speed detection processing, the determination of step 160 is positive and the processing advances to step 164. In step 164, measurement of the periods Ti of the output pulse signal from the rotary encoder 52 begins. The measurement of the periods Ti is achieved by repeatedly measuring durations from one of the lines 72 passing through the sensing position until the next of the lines 72 passes through the sensing position, on the basis of changes in the signal level of the output pulse signal. For the points in time at which the lines 72 "pass through the sensing position", any of the following may be employed: a time at which a pulse of the output pulse signal falls; a time at which a pulse of the output pulse signal rises; and a certain time within a period from a pulse of the output pulse signal falling to a pulse rising (for example, a timing corresponding to the middle of that period).

Then, in step 166, the variable i is reset to 1. In step 168, the derivatives of the profile of displacement amounts w that have been calculated and memorized in the above step 158 over one revolution of the code wheel 70 are read from the RAM 86C or the like. In association therewith in step 168, the radius R of the sensing position that has been pre-memorized in the non-volatile memory section (the ROM 86B or the NVM 86D) is read from the memory section. Also in step 168, the read out derivatives and radius R are substituted into equation (7) and the pulse angle $\Theta_0'$ is calculated. Then the calculated pulse angle is memorized in the RAM 86C, overwriting the pulse angle $\Theta_0'$ that was read in step 156. Thus, the pulse angle $\Theta_0'$ memorized in the RAM 86C is updated. Hence, the updated pulse angle $\Theta_0'$ is used in subsequent processing.

In step 170, similarly to the previously described step 152, it is judged whether or not a timing at which the displacement amount wi in the vicinity of the portion of the surface of the code wheel 70 at which line i is recorded has arrived. Step 170 is repeated until the determination is positive. When the determination of step 170 is positive, the processing advances to step 172. In step 172, similarly to the previously described step 154, the output pulse signal and the output current value of the optoelectronic conversion section 80 inputted from the rotary encoder 52 are acquired. Then in step 172, the displacement amount wi for the vicinity of line i is calculated on the basis of the acquired output current value. Further in step 172, the calculated displacement amount wi overwrites the displacement amount wi that was memorized in the RAM 86C.

Then, in step 174, the pulse angle $\Theta_0'$ that was updated in the preceding step 168 is read out from the RAM 86C. In step 176, the displacement amounts wi−1 and wi memorized in the RAM 86C are read out (the displacement amount wi that is read out here is the displacement amount wi calculated in step 172). Then in step 176, similarly to the previously described step 158, the read out displacement amounts wi−1 and wi and the pulse angle $\Theta_0'$ read out in step 174 are substituted into equation (9). Further in step 176, the derivative of the profile of displacement amounts w is calculated for the vicinity of the portion at which line i is recorded. Then this calculated derivative overwrites the corresponding derivative that had been memorized in the RAM 86C (the derivative of the profile of displacement amounts w for the vicinity of the portion at which line i is recorded).

Then, in step 178, it is determined whether or not measurement of the period Ti of the output pulse signal (the duration from the line i passing through the sensing position until the following line i+1 passes through the sensing position) has ended. Step 178 is repeated until this determination is positive. When the determination of step 178 is positive, the processing advances to step 180. In step 180, the radius R of the sensing position that has been pre-memorized in the non-volatile memory section (the ROM 86B or the NVM 86D) is read out. Then in step 180, the read out radius R is substituted into equation (6) along with the pulse angle $\Theta_0'$ read in step 174 and the derivative calculated in step 176. Then in step 180, a pulse angle θi for the region of the surface of the code wheel 70 from line i to line i+1 is calculated. Then, in step 182, the measurement result of the period Ti of the output pulse signal is read out. In step 184, the pulse angle θi calculated in step 180 and the period Ti read in step 182 are respectively substituted into equation (8). Thus, a rotation angular speed ωi for the period from line i passing through the sensing position to the following line i+1 passing through the sensing position is calculated. The calculated rotation angular speed ωi is memorized in the RAM 86C.

Then, in step 186, it is determined whether or not the variable i has reached the total number N of the lines 72. If the determination is negative, the variable i is incremented by 1 in step 188, after which the processing returns to step 170. Thus, steps 170 to 188 are repeated until the determination of step 186 is positive. Accordingly, the derivatives of the profile of displacement amounts w at the vicinities of the positions at which the individual lines 72 are recorded on the surface of the code wheel 70 are sequentially calculated and memorized for updating. In parallel therewith, the rotation angular speeds ω for the periods from the individual lines 72 passing through the sensing position to the following lines 72 passing through the sensing position are sequentially calculated and memorized.

When the code wheel 70 has turned through one revolution since the variable i was reset to 1 in the preceding step 166, the determination of step 186 is positive and the processing returns to step 166. At this time, the variable i is again reset to 1. Correspondingly, in step 168, the pulse angle $\Theta_0'$ is calculated again on the basis of the derivatives of the profile of displacement amounts w that have been calculated and memorized in the preceding cycle of rotation of the code wheel 70. Hence, the updated pulse angle $\Theta_0'$ is used in subsequent processing.

Thus, in the speed detection processing relating to the present exemplary embodiment, displacement amounts wi in the rotation axis direction at respective positions along the circumferential direction of the code wheel 70 are sensed (calculated) in each period of the rotation cycle of the code wheel 70. Moreover, in the speed detection processing, the derivatives of the profile of displacement amounts w of the code wheel 70 for the respective positions along the circumferential direction of the code wheel 70 are calculated and updated. Further, in the speed detection processing relating to the present exemplary embodiment, the rotation angular speeds ωi of the code wheel 70 are calculated. Correspondingly, the pulse angle $\Theta_0'$ is calculated and updated on the basis of the derivatives of the profile of displacement amounts w calculated in a preceding rotation cycle. Therefore, even if amounts and states of ripple deformation of the code wheel 70 change due to changes in ambient temperature and the like, and the profile of displacement amounts w changes correspondingly, the changes in the profile of displacement amounts w of the code wheel 70 are reflected in the calculations of the rotation angular speeds ωi.

Anyway, an example has been described hereabove in which the lines 72 have higher density than the surface of the code wheel 70 (the background). However, the present invention is not to be limited to this and the lines 72 may have lower density than the surface of the code wheel 70 (the background). In this case, detected light amounts at the optoelectronic conversion section 80 are larger in second periods in which the areas at which the lines 72 are recorded on the surface of the code wheel 70 are passing through the sensing position than in first periods in which the gaps between the lines 72 on the surface of the code wheel 70 are passing through the sensing position. Therefore, this case is constituted such that the displacement amounts w of the code wheel 70 in the rotation axis direction are calculated on the basis of detected light amounts (output current values) in the second periods.

Figure 8A:
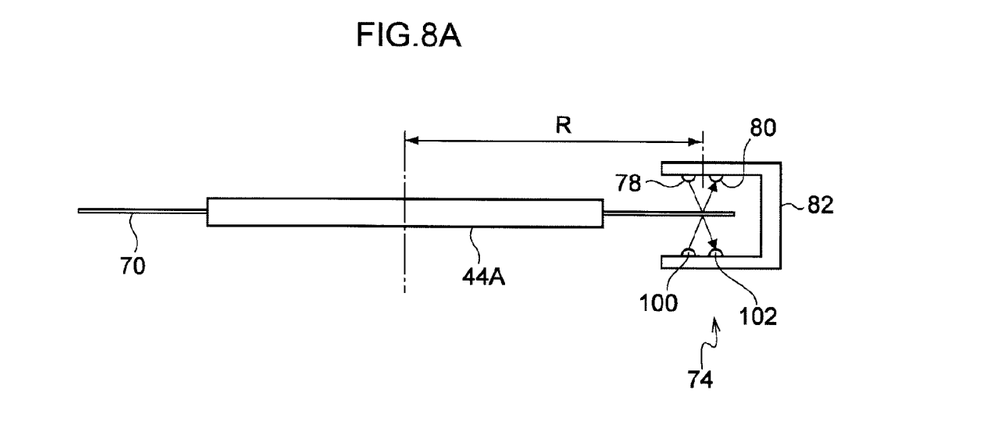
FIG. 8A and FIG. 8B are schematic views illustrating another mode of the exemplary embodiment.

Further, in the above description, with the light source 78 and optoelectronic conversion section 80 of the sensing section 74 for generating and outputting the output pulse signal, the displacement amounts w of the code wheel 70 are calculated from output voltage values of the optoelectronic conversion section 80. The present invention is not to be limited to this. For example, as illustrated in FIG. 8A, two sets of light sources and optoelectronic conversion sections may be provided (a set of the light source 78 and the optoelectronic conversion section 80 and a set of a light source 100 and an optoelectronic conversion section 102), with one set being used for generating and outputting the output pulse signal and the other set being used for sensing (calculating) the displacement amounts w of the code wheel 70.

Further, in the above description, a mode has been described in which the displacement amounts w in the rotation axis direction of the code wheel 70 are calculated on the basis of detected light amounts (output current values) at the optoelectronic conversion section 80 of the sensing section 74. However, the present invention is not to be limited to the structure described above. For example, a structure may be employed that is provided with a non-contact type displacement measurement device, such as a laser displacement meter or the like, and in which the displacement amounts w in the rotation axis direction of the code wheel 70 are measured at timings synchronized with the output pulse signal.

Further yet, in the above description, a structure is described, as an example, in which the output pulse signal from the optoelectronic conversion section 80 is outputted by the optoelectronic conversion section 80 detecting light that has been emitted from the light source 78 of the sensing section 74 and reflected at the surface of the code wheel 70. However, the present invention is not to be limited by the above structure. For example, the code wheel 70 may be a transparent body and a displacement measurement device capable of measuring displacements of transparent bodies may be provided (for example, a non-contact type displacement measurement device such as the aforementioned laser displacement meter or the like). Accordingly, a transmission-type structure may be employed in which an optoelectronic conversion section detects light that has been emitted from the light source and transmitted through the code wheel, and the output pulse signal is outputted from this optoelectronic conversion section.

In FIG. 3A and FIG. 3B, a structure is illustrated in which the single sensing section 74 is provided to serve as a detection section and a measurement section. However, the sensing section 74 is not limited to being a single unit; the sensing section 74 may be plurally provided. Further, a unit that functions as the detection section and a unit that functions as the measurement section may be separately provided, and numbers of the two units may be different.

Figure 8B:
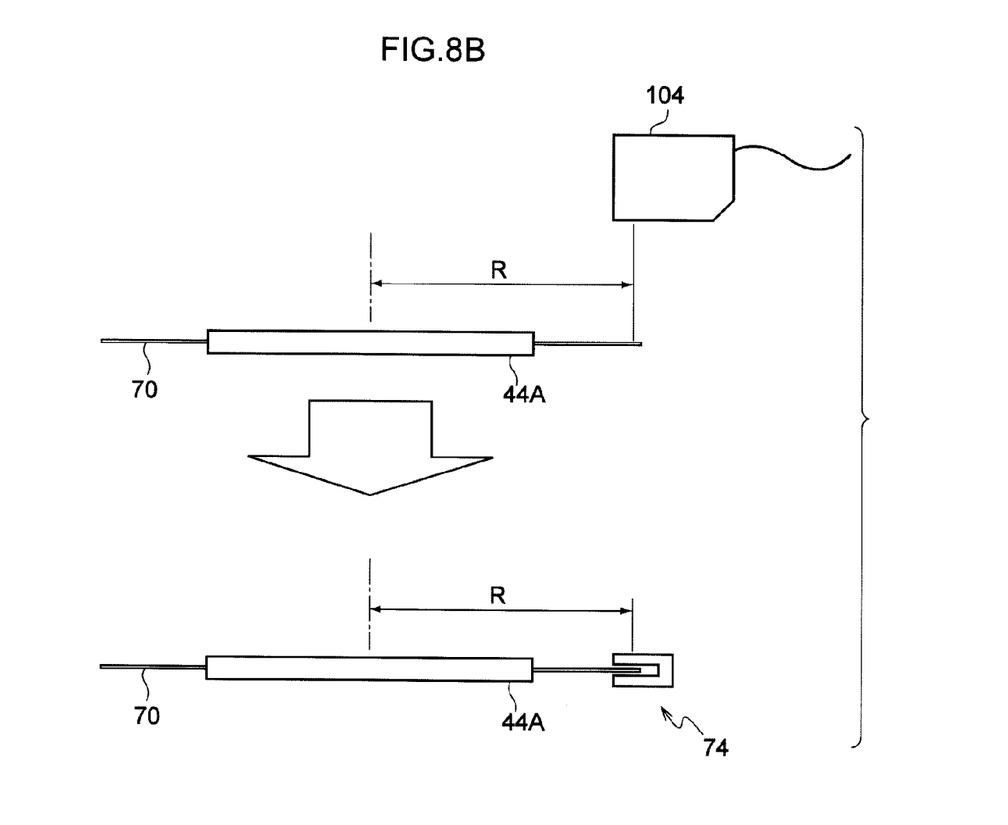

In the above description, a mode has been described in which the displacement amounts wi are sensed (calculated), the derivatives of the profile of displacement amounts w are calculated and memorized, the pulse angles θi are calculated and the rotation angular speeds ωi are calculated over each period of the rotation cycle of the code wheel 70. However, the present invention is not to be limited to this. For example, as illustrated in FIG. 8B, the profile of displacement amounts w of the code wheel 70 may be measured in advance (for example, at a time of shipping of the device or the like) by a displacement measurement device such as a laser displacement meter or the like, and subsequently the sensing section 74 may be attached and detection (calculation) of the rotation angular speeds ωi carried out.

In such a case, a structure is desirable in which the calculation of the derivatives of the profile of displacement amounts w and the calculation of the pulse angles θi are carried out in advance on the basis of the pre-measured profile of displacement amounts w, the calculated pulse angles θi are memorized in the non-volatile memory section, and the pulse angles θi are read out and used at times of detection (calculation) of the rotation angular speeds ωi. However, instead of this, only the calculation of the derivatives of the profile of displacement amounts w may be carried out in advance on the basis of the pre-measured profile of displacement amounts w, with the calculated derivatives being memorized in the non-volatile memory section, and the derivatives being read out and the calculation of the pulse angles θi and detection (calculation) of the rotation angular speeds ωi being successively carried out during the detection (calculation) of the rotation angular speeds ωi. Alternatively, the pre-measured profile of displacement amounts w of the code wheel 70 may be memorized in the non-volatile memory section, and the profile of displacement amounts w read out during the detection (calculation) of the rotation angular speeds ωi, with the calculation of the derivatives of the profile of displacement amounts w, the calculation of the pulse angles θi and the detection (calculation) of the rotation angular speeds ωi being successively carried out on the basis of the read out profile of displacement amounts w.

In the above description, a mode has been described in which the present invention is applied to the detection of rotation angular speeds ω of the code wheel 70 according to the rotary encoder 52. However, the present invention is not to be limited to this. For example, the present invention may be applied to the detection of movement speeds of a moving body that moves in a straight line. Further, in the above description, a mode has been described in which the detected body moves and the detection section (the sensing section 74) is stationary. However, when detecting a movement speed of a moving body that moves in a straight line, a mode may be considered in which plural marks are arrayed on a movement path of the moving body, the detection section is provided integrally with the moving body, and the detected body (the movement path) is stationary and the detection section moves. Application in such modes is to be encompassed within the scope of rights of the present invention.

In the above description, a mode has been described in which the speed detection program relating to the present invention is pre-memorized (installed) in the ROM 86B. However, the speed detection program relating to the present invention may be provided in a form that is recorded at a recording medium such as a CD-ROM, a DVD-ROM or the like.

Figure 9A:
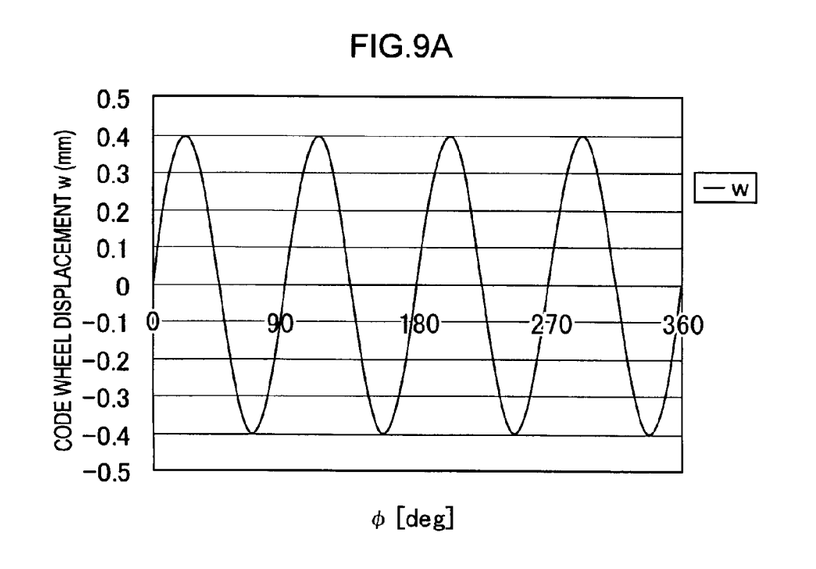
FIG. 9A and FIG. 9B are graphs illustrating results of simulations using the present exemplary embodiment.

Next, an experiment (simulation) using the present exemplary embodiment will be described. In this simulation, the radius R of the sensing position was 70 mm, and the total number N of the lines recorded on the code wheel was 5000. As illustrated in FIG. 9A, displacements were caused at the code wheel in which an amplitude of displacement amounts w in the rotation axis direction of the code wheel was 0.4 mm, and a number of waves of the displacement amounts w along the circumferential direction of the code wheel was 4. Then, on the basis of output pulse signals from a rotary encoder, proportional errors included in calculated rotation angular speeds ω (detected speed error ratios) were respectively found for when the rotation angular speeds ω were calculated in accordance with equation (2) (uncorrected) and when the rotation angular speeds ω were calculated with the speed detection processing to take account of the displacements of the code wheel in the rotation axis direction (corrected). The results are illustrated in FIG. 9B.

Figure 9B:
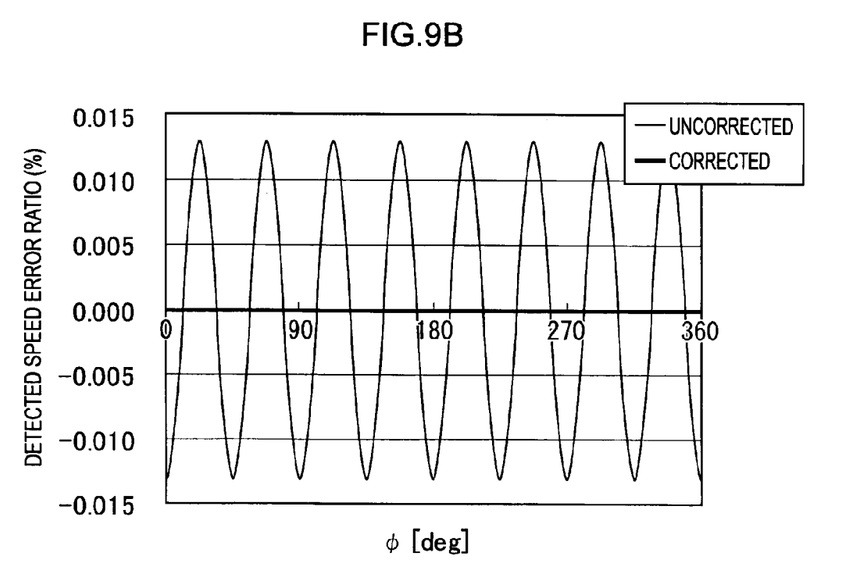

As illustrated in FIG. 9B, speed detection errors of the order of ±0.013% occur in the uncorrected case. The image forming device 10 relating to the present exemplary embodiment sets ink droplet ejection timings in accordance with the rotation angular speeds ω of the code wheel. With this kind of image forming device, relative to ideal ink droplet ejection timings with which spacings between dots on a recording medium are precisely constant, it is found that ultimate errors in the ink droplet ejection timings should be kept to within, for example, around 0.02%. In practice, errors arise when generating the pulse signals that regulate the ink droplet ejection timings, and the errors when the pulse signals are generated contribute to the ultimate errors in the ink droplet ejection timings. Therefore, in conditions in which the ultimate errors in the ink droplet ejection timings are to be kept to within 0.02%, speed detection errors of the order of ±0.013% cannot be ignored.

On the other hand, as shown in the corrected case where the present invention is applied, speed detection errors decrease to nearly 0. To be exact, slight speed detection errors due to errors in calculating the derivatives may occur. However, speed detection errors are decreased to an extent that such errors may be ignored, when compared to the uncorrected case where the present invention is not applied.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A speed detection device comprising:
a detected body that includes a plurality of marks arranged along a first direction with intervals therebetween;
a detection section that detects intervals of times of appearance of the marks when the detected body relatively moves in the first direction; and
a calculation section that calculates a speed of relative movement of the detection section and the detected body on the basis of results of measuring displacements from a reference plane in a second direction, which is orthogonal to the first direction, of locations of the detected body along the first direction, intervals between the plurality of marks in the reference plane when the plurality of marks are projected onto the reference plane, which the intervals are found from the results of measuring the displacements in the second direction, and the detected intervals of times of appearance of the marks.

2. The speed detection device according to claim 1, further comprising, a measurement section that measures the displacements in the second direction from the reference plane at the locations of the detected body,
wherein the calculation section calculates the intervals between the plurality of marks in the reference plane when the plurality of marks are projected onto the reference plane on the basis of the displacements in the second direction measured by the measurement section.

3. The speed detection device according to claim 1, wherein from the results of measuring the displacements in the second direction, the calculation section finds gradients of change of the displacements at a movement speed calculation object location, on the basis of the gradients and the intervals between the plurality of marks, the calculation section calculates the intervals between the plurality of marks disposed in the reference plane when the plurality of marks disposed at the movement speed calculation object location are projected onto the reference plane, and, on the basis of the calculated intervals between the plurality of marks and the detected intervals of times of appearance of the marks at the movement speed calculation object location, the calculation section calculates the relative movement speed of the detection section and the detected body.

4. The speed detection device according to claim 1, further comprising,
a memory section that memorizes at least one of, the results of measuring the displacements in the second direction, gradients of change of the displacements at the locations of the detected body, and the intervals, found from the results, between the plurality of marks in the reference plane when the plurality of marks are projected onto the reference plane,
wherein the calculation section reads the memorized information and, using the information, calculates the relative movement speed of the detection section and the detected body.

5. The speed detection device according to claim 2, wherein the detection section includes:
a light source; and
a light detection section that detects light emitted from the light source and reflected at the detected body,
wherein, the detection section detects the marks on the basis of changes in light amounts detected by the light detection section, and
the measurement section measures the displacements of the detected body from the reference plane in the second direction on the basis of the light amounts.

6. An image forming device comprising:
a recording section that records an image at a recording medium;
a speed detection device according to claim 1 that calculates movement speeds of the detected body, which moves integrally with the recording medium, the detection section being fixedly provided; and
a control section that, when an image is being recorded, controls timings of recording the image on the basis of the movement speeds of the detected body that are detected by the speed detection device.

7. A non-transitory computer readable medium storing a program causing a computer to execute a process for detecting speed, the computer being connected to a detected body that includes a plurality of marks arranged along a first direction with intervals therebetween, and a detection section that detects intervals of times of appearance of the marks when the detected body relatively moves in the first direction, and the process comprising:
measuring displacements from a reference plane in a second direction, which is orthogonal to the first direction, of locations of the detected body along the first direction;
detecting the intervals of times of appearance of the marks with the detection section; and
calculating a movement speed of relative movement of the detection section and the detected body on the basis of intervals between the plurality of marks in the reference plane when the plurality of marks are projected onto the reference plane, which the intervals are found from the results of measuring the displacements in the second direction, and the detected intervals of times of appearance of the marks.

8. A method of detecting speed at a speed detection device that includes, a detected body that includes a plurality of marks arranged along a first direction with intervals therebetween and a detection section that detects intervals of times of appearance of the marks when the detected body relatively moves in the first direction, the method comprising:
measuring displacements from a reference plane in a second direction, which is orthogonal to the first direction, of locations of the detected body along the first direction;
detecting the intervals of times of appearance of the marks; and
calculating a movement speed of relative movement of the detection section and the detected body on the basis of intervals between the plurality of marks in the reference plane when the plurality of marks are projected onto the reference plane, which the intervals are found from the results of measuring the displacements in the second direction, and the detected intervals of times of appearance of the marks.

* * * * *